No. 606,783. Patented July 5, 1898.
J. C. HENDERSON.
APPARATUS FOR REFINING OILS.
(Application filed Aug. 25, 1897.)

(No Model.)

Witnesses:
E. B. Bolton
C. L. Rogers

Inventor:
John C. Henderson
By James R. Rogers
his Attorney.

UNITED STATES PATENT OFFICE.

JOHN C. HENDERSON, OF NEW YORK, N. Y.

APPARATUS FOR REFINING OILS.

SPECIFICATION forming part of Letters Patent No. 606,783, dated July 5, 1898.

Application filed August 25, 1897. Serial No. 649,451. (No model.)

*To all whom it may concern:*

Be it known that I, JOHN C. HENDERSON, a citizen of the United States, residing at New York, in the county of New York and State of New York, have invented certain new and useful Improvements in Apparatus for Separating and Extracting Impurities from Oils; and I do hereby declare the following to be a full, clear, and exact description of the invention, such as will enable others skilled in the art to which it appertains to make and use the same.

This invention relates to apparatus for separating, extracting, and purifying oils and similar materials; and some of the objects of the invention are to produce an apparatus which will simultaneously effect the extraction of albuminous, gummy, resinous, and mucilaginous matter and other extractable substances from vegetable oils without bleaching the oils and to produce an apparatus of this character which will be simple in construction and effective in operation; and with these and other objects in view the invention consists in the construction, combination, and arrangement of parts, substantially as hereinafter more fully described in the specification and illustrated in the accompanying drawings, in which—

Figure 1:
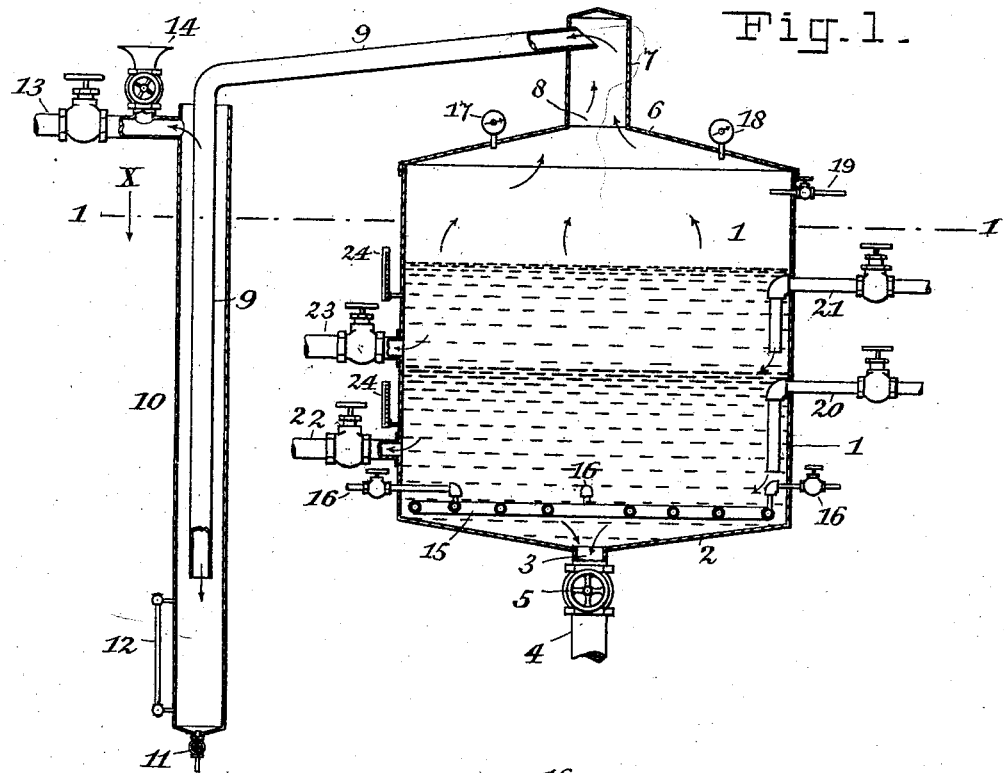
Figure 2:
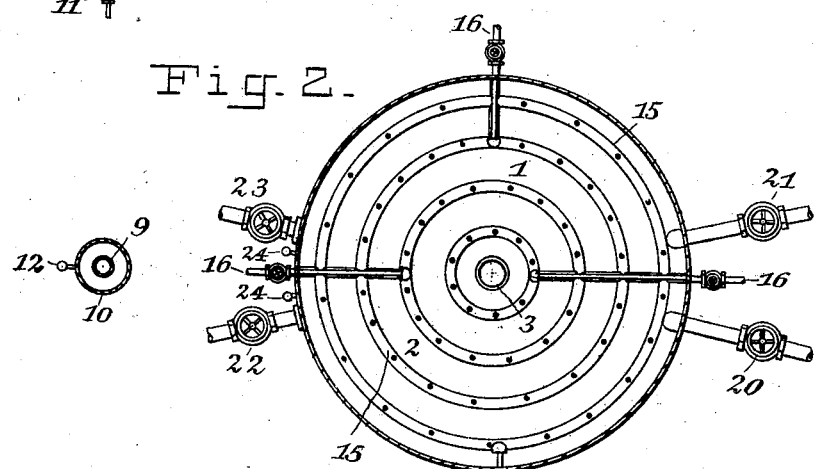

Figure 1 is a longitudinal section of my improved apparatus, parts being shown in elevation; and Fig. 2 is a horizontal section on line 1 1 of Fig. 1, looking in the direction of the arrow X.

Similar characters of reference designate like parts throughout both views.

Referring to the drawings, the reference character 1 indicates a tank of any suitable material, preferably shallow, and having a concave or inclined bottom 2 sloping in all directions toward a central opening 3, provided with a discharge or drain pipe 4, having a stop-valve or similar device 5, adapted to be used to draw off the contents of the tank when necessary, and the peculiar formation of the bottom 2 causes the contents of the tank to drain off toward the drain-pipe 4 when washing out the tank, and the top 6 of the tank is outwardly inclined or slopes toward the pipe 7, secured around the central opening 8 in the top 6, and the free end of this pipe 7 is preferably closed. Communicating with one side thereof is an outlet-pipe 9, the free end of which is located within a doodlesack or drain-chamber 10, provided at its lower end with a valve-controlled outlet or drain pipe 11, through which is drawn off, with or without the condensed water, the higher oils and light volatile matter deposited in the doodlesack 10, and to determine the amount of such matter within the doodlesack a gage-glass 12 is preferably connected therewith, as shown in the drawings.

A valve-controlled pipe 13 communicates with the upper end of the doodlesack 10 and is suitably connected with a condenser or vacuum-pump, (not shown,) and communicating with the pipe 13, adjacent to the doodlesack 10, is a valve-controlled outlet 14 to the atmosphere.

Suitably disposed with the lower portion of the tank 1 is a perforated steam coil or coils 15 of any preferred construction, provided with valve-controlled steam-supply pipes 16, communicating with a source of supply, (not shown,) and the tank 1 is also provided with a steam-gage 17 and a vacuum-gage 18 of any preferred construction, and communicating with the upper portion of the tank is a steam-jet 19, having connections with a source of supply, (not shown,) adapted to admit steam to the upper portion of the tank and drive out the air therein and to prevent the forming of air-pockets on top while the vapor is going off, and communicating with the lower portion of the tank, above the steam-coils 15, is a valve-controlled water-inlet 20, by means of which water is introduced into the tank to any desired height, preferably to that shown by heavy dotted lines about on a level with said inlet, and above the water-inlet 20 is an oil-inlet 21, also communicating with the tank, and through this last-mentioned inlet the oil or other material to be treated is introduced into the tank above the water, preferably to the height indicated by the upper dotted lines upon the drawings. The tank 1 is also supplied with outlets 22 and 23, provided with valves, the former being for extracts and the latter for the purified material, and with thermometers or similar devices 24 to ascertain the temperature or condition of the contents of the tank.

The operation will be readily understood from the foregoing description when taken in connection with the accompanying drawings and the following explanation thereof.

This apparatus is principally for the separation and extraction of the albuminoids, resins, gums, mucilaginous matter, volatile oils, &c., from vegetable and the heavier and denser as well as the lighter or volatile matter from other oils.

The valves in the pipes 13, 4, 11, 22, and 23 are first closed and the valve in the pipe 14 is opened. Then water is admitted through the inlet 20 until the water-line in the tank has reached the desired height, when the supply is cut off and the oil to be treated is introduced into the tank above the water through the inlet 21 until it stands at the height desired, whereupon the supply is then cut off and a steam-jet is injected into the upper portion of the tank just sufficient to drive out the air without forming a vacuum or pressure. Then steam is admitted to the perforated coils 15 for the length of time the case may require, when the steam is shut off from the coils, and the valve in the pipe 14 is then closed and the valve in the pipe 13 is opened, whereupon the steam-coil 15 is again put in operation for the time the case may require, when the valve in the pipe 13 is closed and steam is admitted through the jet 19 in small quantities, and the purified oil may then be drawn off through the pipe 23 and the albuminous matter may be removed through the pipe 22. The level to draw off the albuminous matter is controlled by the admission of water through the inlet 20 or by drawing it off through the drain-pipe 4. When the operation has been completed, the wash-water is then discharged through the drain-pipe 4 into a sewer or drain-tank (not shown) and the apparatus is washed out with water and steam to prepare it for another operation. The higher oils and light volatile matter is deposited in the doodlesack 10, from whence it may be drawn off with or without the condensed water through the pipe 11.

I do not desire to confine myself to the construction, combination, and arrangement of parts herein shown and described, and I therefore reserve the right to make all such changes in and modifications of the same as fairly come within the spirit and scope of my invention.

Having fully described my invention, what I claim as new, and desire to secure by Letters Patent, is—

1. An apparatus of the character described consisting of a tank having a sloping bottom converging toward a valve-controlled discharge-opening and a sloping top provided with a closed pipe, a drain-chamber adjacent to the tank, a pipe connecting the former and the latter, a steam-jet near the top of the tank to drive the air therefrom, a perforated steam-coil on the bottom of the tank, a water-inlet at one side of the tank above said coil and an inlet for the material above said water-inlet, whereby the water is introduced above the coil then the material is introduced upon the water and is treated by the ebullition of the water.

2. An apparatus for separating, extracting and purifying oils consisting of a tank having an upwardly-inclined top converging toward a central closed pipe to facilitate the removal of the air and vapors, a drain-chamber, connections between said pipe and chamber, a perforated steam-coil in the bottom of the tank, a water-supply pipe in one side of the tank above the coil to permit the introduction of the water upon the coil, an oil-supply pipe above the water-pipe to direct the oil upon the top of the water, and a steam-jet above the oil-pipe adapted to drive off the air and vapors through said central closed pipe, all operating as specified.

3. An apparatus for separating, extracting and purifying oils consisting of a tank having an upwardly-inclined top converging toward a central closed pipe to facilitate the removal of the air and vapors, a drain-chamber, connections between said pipe and chamber, a perforated steam-coil in the bottom of the tank, a water-supply pipe in one side of the tank above the coil, to permit the introduction of the water upon the coil, an oil-supply pipe above the water-pipe to direct the oil upon the top of the water, a steam-jet above the oil-pipe adapted to drive off the air and vapors through said central closed pipe, and a discharge-pipe for extracts and for purified oil, substantially as and for the purpose set forth.

In testimony whereof I affix my signature in presence of two witnesses.

JOHN C. HENDERSON.

Witnesses:
JAMES R. ROGERS,
D. C. KELSEY.